United States Patent
Dauerer et al.

(10) Patent No.: US 6,687,514 B1
(45) Date of Patent: Feb. 3, 2004

(54) BASE STATION FOR A RADIO COMMUNICATIONS SYSTEM

(75) Inventors: Jörg Dauerer, Gröbenzell (DE); Dieter Emmer, Starnberg (DE); Ralf Foissner, Wolfratshausen (DE); Zoran Gardijan, München (DE); Heiko Junker, München (DE); Holger Kunze, München (DE); Franz Schreib, München (DE); Jörg Sokat, München (DE); Peter Spennemann, Oberhaching (DE); Gerhard Steib, München (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 09/592,300

(22) Filed: Jun. 12, 2000

Related U.S. Application Data

(63) Continuation of application No. PCT/DE98/03532, filed on Dec. 1, 1998.

(30) Foreign Application Priority Data

Dec. 12, 1997 (DE) .......................................... 197 55 379

(51) Int. Cl.[7] .................................................. H04M 1/00
(52) U.S. Cl. ................. 455/561; 455/62.11; 455/67.14; 455/503; 455/524; 455/425; 370/347; 370/330; 370/321; 370/338
(58) Field of Search ........................... 455/67.14, 67.11, 455/622, 503, 424, 425, 581; 370/347, 338, 330, 321

(56) References Cited

U.S. PATENT DOCUMENTS

| 5,506,837 | A | * | 4/1996 | Sollner et al. ............... 370/296 |
| 5,550,898 | A |   | 8/1996 | Abbasi et al. |
| 5,555,260 | A | * | 9/1996 | Rinnback et al. ............ 370/347 |
| 5,963,868 | A | * | 10/1999 | Baek ........................... 455/503 |
| 5,966,375 | A | * | 10/1999 | Kagaya ........................ 370/338 |
| 6,366,602 | B1 | * | 4/2002 | Raitola ........................ 375/135 |

FOREIGN PATENT DOCUMENTS

| DE | 44 23 582 A1 | 1/1995 |
| EP | 0 560 388 A1 | 9/1993 |
| EP | 0 650 305 A1 | 4/1995 |
| WO | WO-97/33388 A1 * | 9/1997 |

OTHER PUBLICATIONS

Published European Patent Application No. 0 560 388 A1 (Sato), dated Sep. 15, 1993, as mentioned on p. 2 of the specification.

* cited by examiner

Primary Examiner—Sinh Tran
Assistant Examiner—David Q Nguyen
(74) Attorney, Agent, or Firm—Laurence A. Greenberg; Werner H. Stemer; Gregory L. Mayback

(57) ABSTRACT

A base station for a radio communications systems contains at least one carrier-related transceiver device and at least one central unit for controlling the base station. The transceiver device and the central unit each contain at least one interface device which are connected by at least one individual line in accordance with a point-to-point connection for transmitting traffic data. Therefore, point-to-point connections with individual lines for each transceiver device that do not need to satisfy the requirements of identical lengths are used instead of a bus structure. In this way, an essentially more cost-effective implementation of the transmission of traffic data between the central unit and transceiver device is possible because the data rate can also be increased in accordance with the length of the individual line. A logic bus structure is mapped onto physical point-to-point connections. Traffic data, o&m data and also synchronization data are transmitted using the bus structure. The base station is suitable for use in radio communications systems with GSM, TDMA, CDMA radio interfaces, or other radio interfaces.

19 Claims, 7 Drawing Sheets

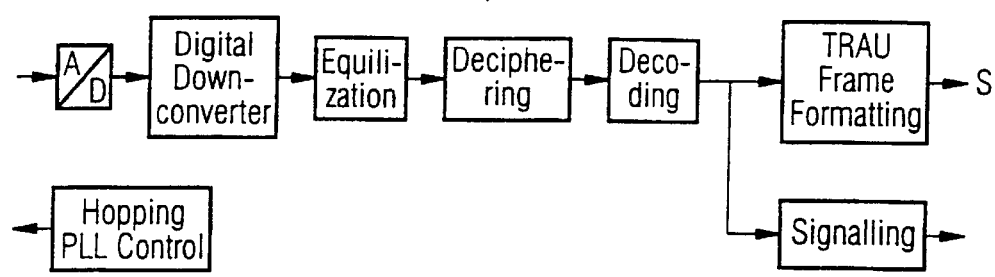
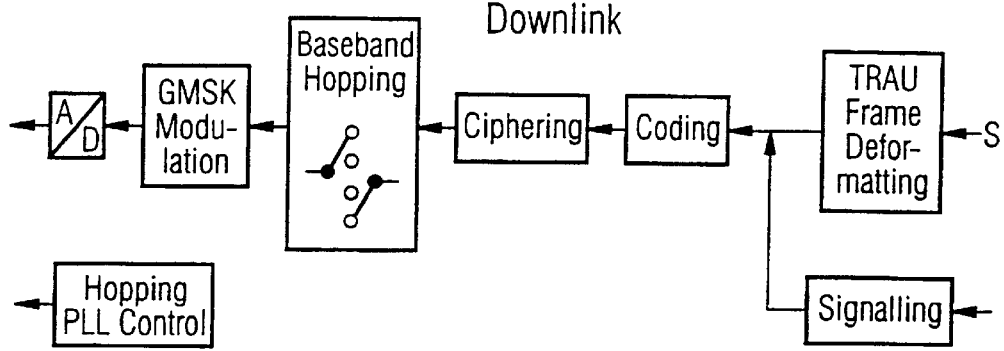
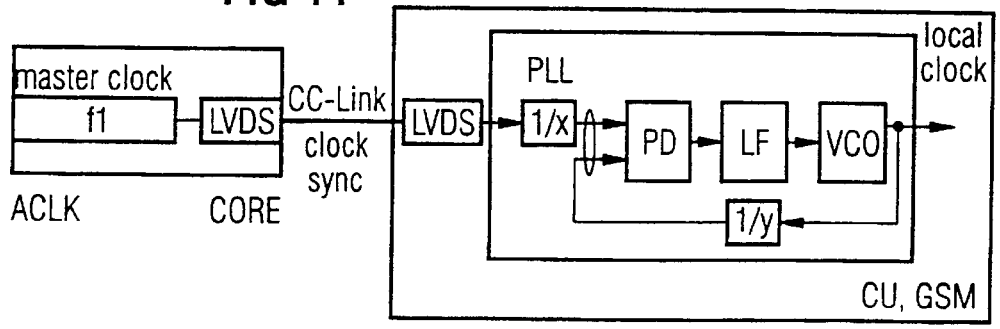

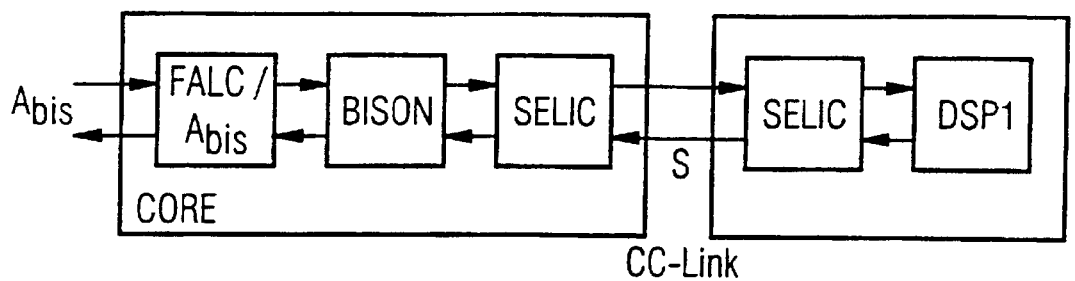
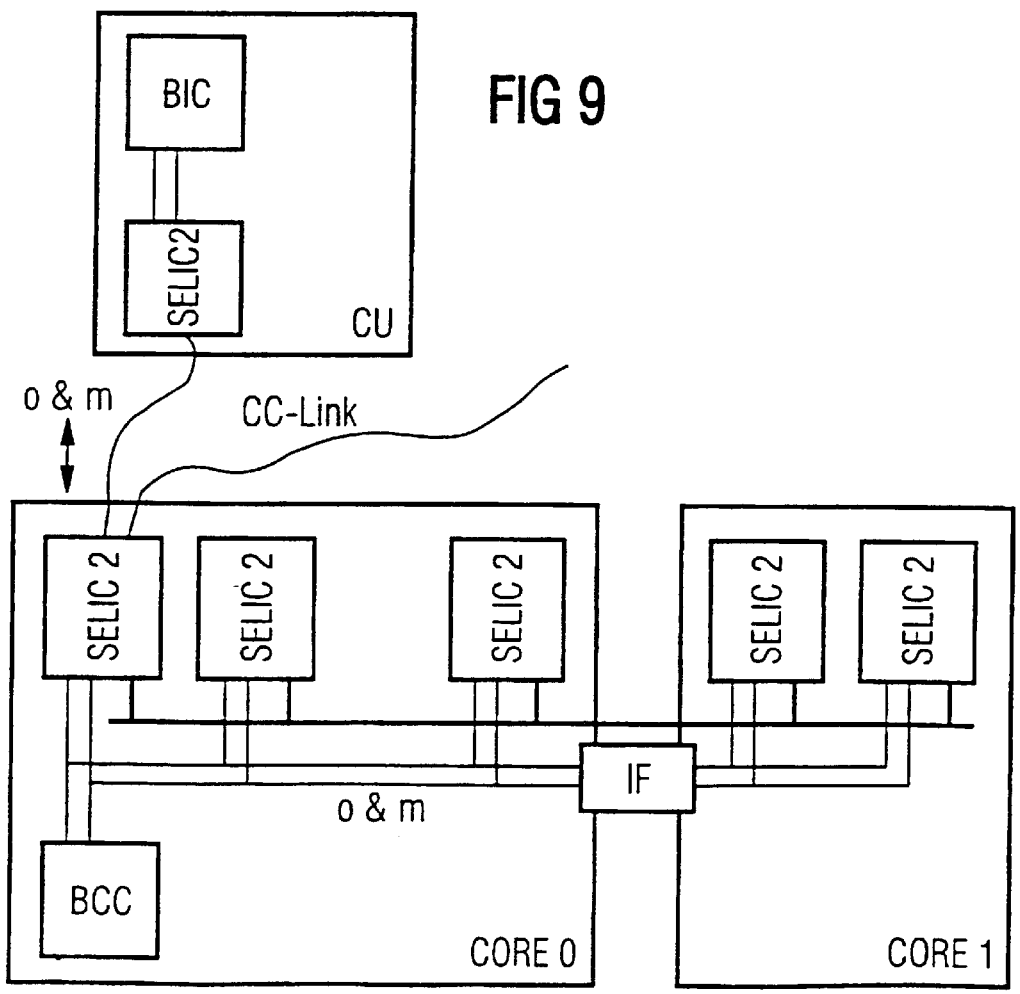

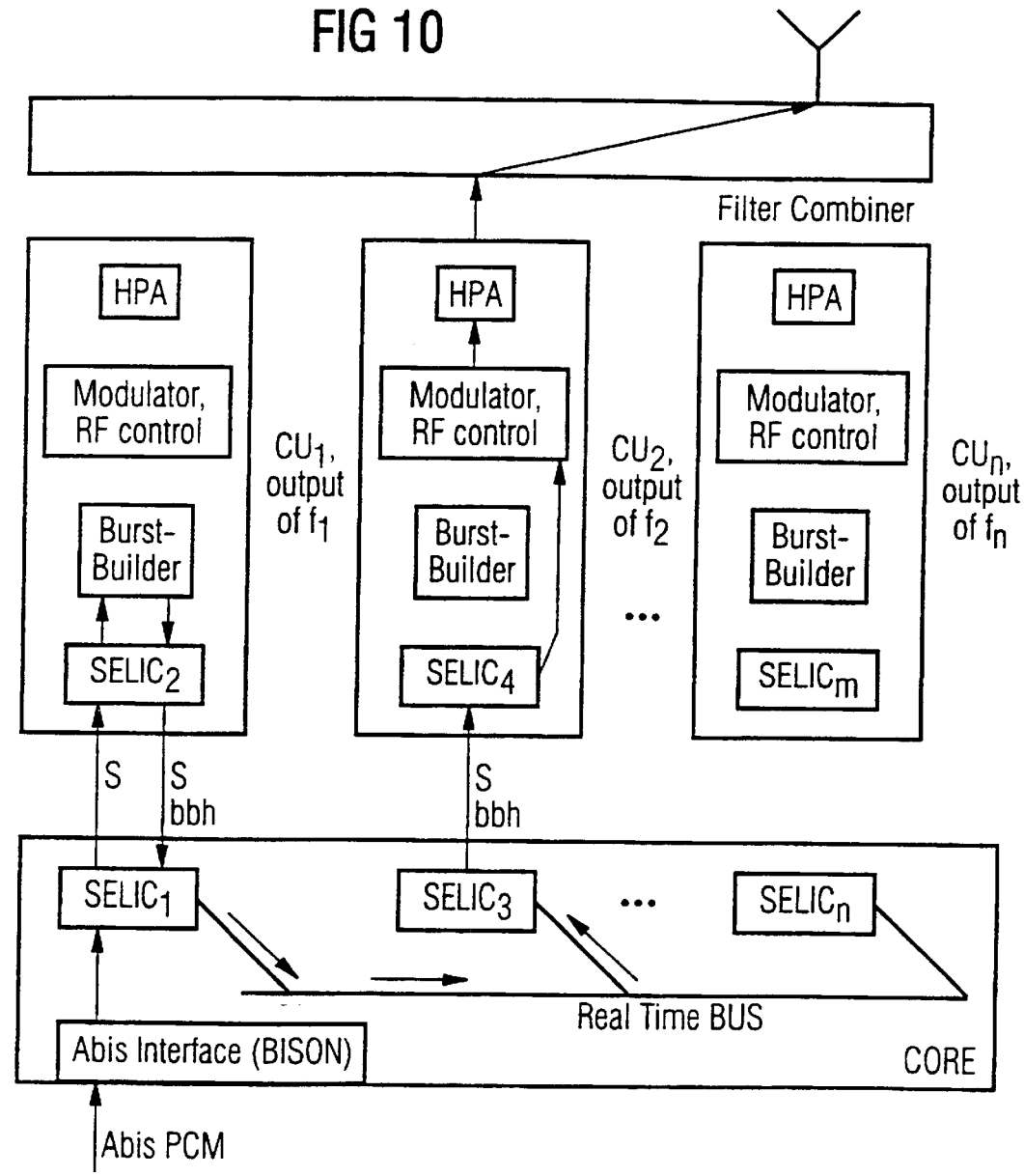

BASE STATION FOR A RADIO COMMUNICATIONS SYSTEM

CROSS-REFERENCE TO RELATED APPLICATION

This is a continuation of copending International Application PCT/DE98/03532, filed Dec. 1, 1998, which designated the United States.

BACKGROUND OF THE INVENTION

Field of the Invention

The invention relates to a base station for a radio communications system, in particular for mobile radio networks.

In radio communications systems, messages (for example voice, image information or other data) are transmitted over a radio interface using electromagnetic waves. The radio interface relates to a connection between a base station and mobile stations, it being also possible to supply fixed radio stations instead of the mobile stations. The electromagnetic waves are emitted here using carrier frequencies that lie in the frequency band provided for the respective system. In the case of the global system for mobile communication (GSM), the carrier frequencies lie in the region of 900, 1800 or 1900 MHz. For future radio communications systems, for example the universal mobile telecommunication system (UMTS) or other third generation systems, frequencies in the approximately 2000 MHz frequency band are provided.

European Patent Application EP 0 560 388 A1 (which corresponds to U.S. Pat. No. 5,321,690) discloses a base station which contains for a time division multiple access (TDMA) transmission method a multiplicity of transceiver devices which are connected to central devices, for example interface devices, over a common bus system. Traffic data and control data are transmitted in parallel here.

The length of the lines of the bus structure reduces the possible data rate of a transmission over the bus structure owing to the physical properties of the lines. Furthermore, it is necessary to provide identical lengths for the various lines in order to ensure that the functioning of the bus is physically correct. This gives rise to considerable expenditure because in digital systems each bit must arrive at a receiving module at a particular time.

U.S. Pat. No. 5,555,260 discloses a base station of a cellular mobile radio system which has a point-to-point connection for respective connections between a central amplifier interface and amplifier devices disposed inside or outside the base station.

International Patent Disclosure WO 97/33388 discloses a distributed microcellular communications system in which a macro-cell is divided into a multiplicity of so-called subcells. The subcells are supplied by in each case one remote station for communication with mobile stations, the station being connected to a central base station.

SUMMARY OF THE INVENTION

It is accordingly an object of the invention to provide a base station for a radio communications system that overcomes the above-mentioned disadvantages of the prior art devices of this general type, in which the transmission of traffic data from and to the transceiver devices is improved.

With the foregoing and other objects in view there is provided in a radio communications system, in accordance with the invention, a base station, including:

a least one transceiver device having at least one interface device;

at least one central unit for controlling the base station and having at least one interface device; and at least one individual line for connecting the interface device of the transceiver device to the interface device of the central unit in accordance with a point-to-point connection for transmitting traffic data, the interface device of the transceiver device and the interface device of the central unit configured for propagation time measurement of a transmission over the individual line;

at least one of the transceiver device and the central unit having a synchronization device based on the propagation time measurement.

A base station according to the invention for a radio communications system contains at least one carrier-related transceiver device and at least one central unit for controlling the base station. The transceiver device in this case processes signals of at least one frequency channel on whose carrier frequency tuning is carried out in terms of frequency during transmission and/or reception.

The transceiver device and the central unit each contain at least one interface device which are connected by at least one individual line in accordance with a point-to-point connection for transmitting traffic data. Therefore, in accordance with the prior art according to U.S. Pat. No. 5,555,260, point-to-point connections with individual lines for each transceiver device which do not need to satisfy the requirements of identical lengths are used instead of a bus structure. In this way, an essentially more cost-effective implementation of the transmission of traffic data between the central unit and transceiver device is possible because the data rate can also be increased in accordance with the length of the individual line. When there are a plurality of transceiver devices, they can be distributed spatially as desired.

A logic bus structure is mapped onto physical point-to-point connections. Traffic data, o&m (operations and maintenance) data and also synchronization data can be transmitted using the logic bus structure. The base station is suitable for use in radio communications systems with GSM, TDMA, CDMA radio interfaces, or other radio interfaces.

Furthermore, the interface devices are characteristically configured for propagation time measurement of the transmission over the individual connection. Synchronization devices based on propagation time measurements are provided in the transceiver device and/or central unit. The synchronicity of a plurality of transceiver devices is ensured by measuring and taking into account the signal propagation time on the individual line. If the accuracy of the measurement is sufficient, it is possible to dispense with wider-ranging synchronization. The measurement of the propagation time can be carried out here at one end or at both ends of the individual line.

According to one advantageous development of the invention, the central unit has a plurality of interface devices that are connected to one another by use of short lines. The central unit is composed of one or more circuit boards that are distinguished by small physical size. This reduced size permits rapid and comparatively easily implemented communication within the central unit, while the data that are intended for the respective transceiver device are transmitted over the individual lines. The memories are advantageously provided for the interface devices so that the traffic data are buffered. In this way, the interface devices perform buffering in order to adapt transmission protocols between a transceiver device and the central unit and/or within the modules.

According to a further advantageous embodiment of the invention, the interface devices are configured in such a way that the traffic data are transmitted serially. This saves line costs and avoids problems of identical length within a connection between the central unit and a transceiver device. The individual line is advantageously formed by a pair of lines (twisted pair) for each transmission direction.

It is also possible to transmit clock information and/or control information together with the traffic data. Furthermore, the interface devices are advantageously configured to transmit information for baseband hopping between the transceiver devices. This applies in particular to the connection in the downlink direction. Not only the traffic data but also further information are therefore transmitted by the point-to-point connection. The aforesaid advantages then apply also to this transmission. According to a further embodiment of the invention, real-time information and information for which timing is uncritical are transmitted over the individual connection. The high data rate that can be achieved by the star-shaped structure of the communication between the central unit and transceiver devices permits the various information items to be combined in one transmission protocol. The quantity and order of the transmitted information is restricted by the maximum value of the capacity of the point-to-point connection and by the capacity of the bus on the central unit. If necessary, the quantity of information transmitted can be made to approach this maximum value.

Furthermore, it is possible to provide that a plurality of interface devices of the central unit are connected to one another with a bus structure. The small physical size of the central unit permits a bus structure to be used even with very high data rates, so that the bus structure within the central unit advantageously contains separate lines for real-time information and for information for which timing is uncritical. The respectively most economical solutions can thus be selected for the respective data stream.

According to one development of the invention, the interface devices are configured to transmit with a frame-oriented protocol. The order of the information to be transmitted is defined by the frame protocol. The significance of individual data is thus defined and does not need to be additionally signaled. The timing pattern of the frame-oriented protocol is advantageously oriented according to the timing pattern of a PCM transmission. Because the PCM transmission between the base station and further network-end components of the radio communications system is used for a multiplicity of radio interface standards, the base station according to the invention can easily be adapted to these standards.

In order to improve the transmission security, there may be provision for a synchronization signal to be transmitted from the central unit to the transceiver device. The synchronization signal can be transmitted from one interface to the other interface of the central unit to the transceiver device. Such a synchronization signal can be set individually for each of the transceiver devices, as a result of which even different radio interface standards can be used. A master pulse of the central unit can thus control the transmission of the transceiver device and its clocking. Additionally, the synchronization signal can be adjusted individually for a plurality of transceiver devices.

According to a further development of the invention, the transceiver device is one of a plurality of transceiver devices that use different radio interface standards.

In order to ensure satisfactory operation of the base station in the event of failures of the central unit, the base station can advantageously contain a second central unit which is additionally connected to the transceiver devices by at least a second individual line in accordance with the point-to-point connection. This produces redundancy that permits switching over to the second central unit without the base station failing for a relatively long time.

Other features which are considered as characteristic for the invention are set forth in the appended claims.

Although the invention is illustrated and described herein as embodied in a base station for a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a block diagram of a data flow of traffic data;

FIG. 8 is a block diagram of a PCM data flow;

FIG. 9 is a block diagram of O&M data flow;

FIG. 10 is a block diagram of the data flow for baseband hopping; and

FIG. 11 is a block diagram of a clock transmission.

DESCRIPTION OF THE PREFERRED EMBODIMENTS

Figure 1:
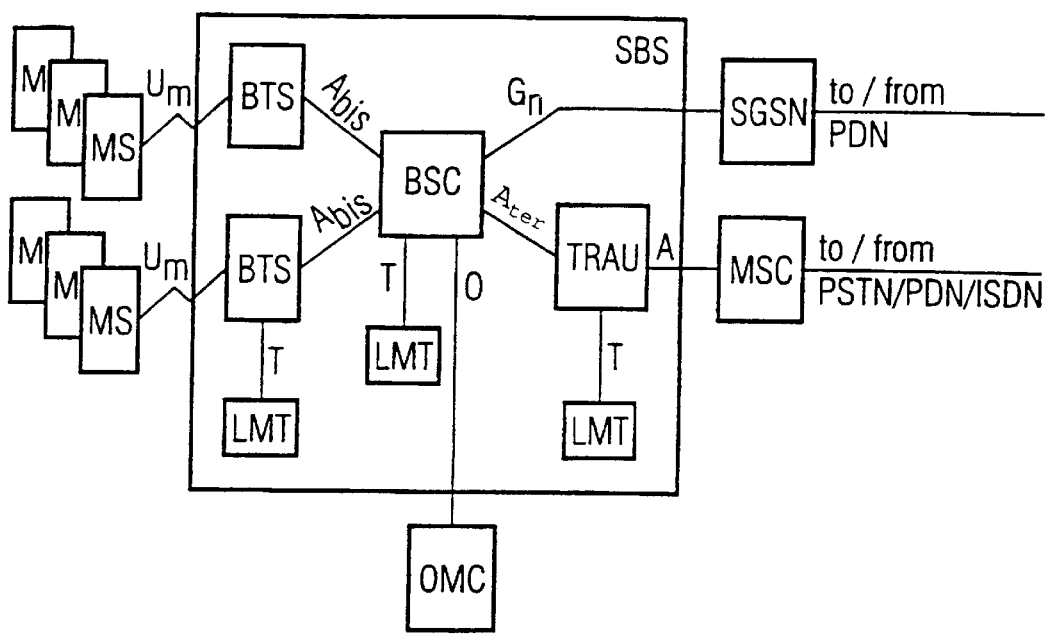
FIG. 1 is a block circuit diagram of a mobile radio network according to the invention.

In all the figures of the drawing, sub-features and integral parts that correspond to one another bear the same reference symbol in each case. Referring now to the figures of the drawing in detail and first, particularly, to FIG. 1 thereof, there is shown an exemplary embodiment of a base station BTS of a GSM mobile radio network without also restricting the general applicability of the structure of the base station BTS to other standards.

An essential component of a mobile radio network is a base station system SBS which contains all the components which are necessary to ensure that a specific geographic zone is provided with radio coverage and that connections to mobile stations MS are thus established. The base station system SBS contains the base stations BTS that are connected to a base station controller BSC over an interface $A_{bis}$. The base station controller BSC is connected over an interface $A_{ter}$ to a transcoder unit TRAU which is in turn connected via an interface A to a mobile switching central MSC. Furthermore, the base station controller BSC is connected to a packet switching center SGSN over an interface $G_n$.

The mobile switching center MSC ensures a network-end connection to a fixed network PSTN, a packet data network PDN or an integrated services digital network (ISDN), while the packet switching center SGSN can set up the connection to the packet data network PDN.

The components BTS, BSC, TRAU of the base station system SBS can be connected to a local monitoring terminal LMT over an interface T. The base station controller BSC is additionally connected over an interface O to a maintenance and operations center OMC. It is possible to set up a radio connection between the mobile station MS and base station BTS over an interface $U_m$.

Figure 2:
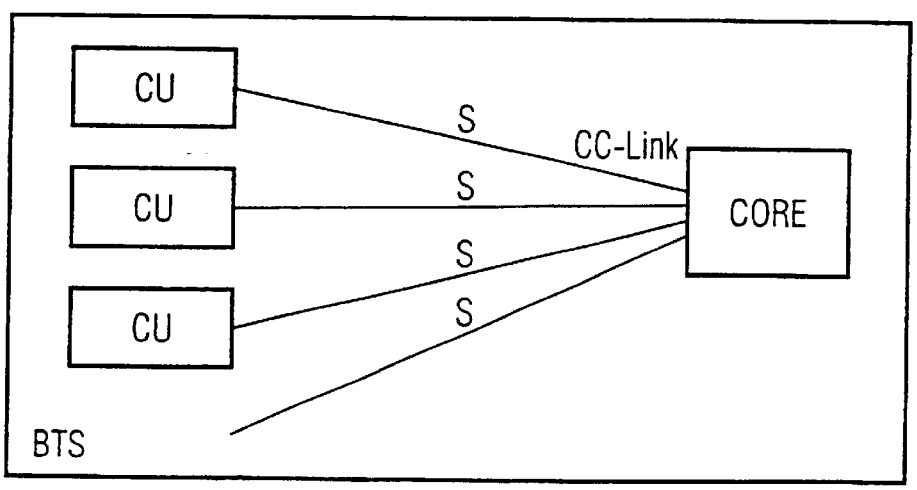
FIG. 2 is a block diagram a communication between a central unit and a transceiver device.

The structure of the base station BTS will now be considered below, the base station BTS containing according to FIG. 2 a central unit CORE and a plurality of transceiver devices CU (carrier unit). The central unit CORE and the transceiver devices CU are connected by a star-shaped structure of individual lines so that a point-to-point connection for traffic data S to be transmitted is produced between the central unit CORE and each of the individual transceiver devices CU.

Figure 3:
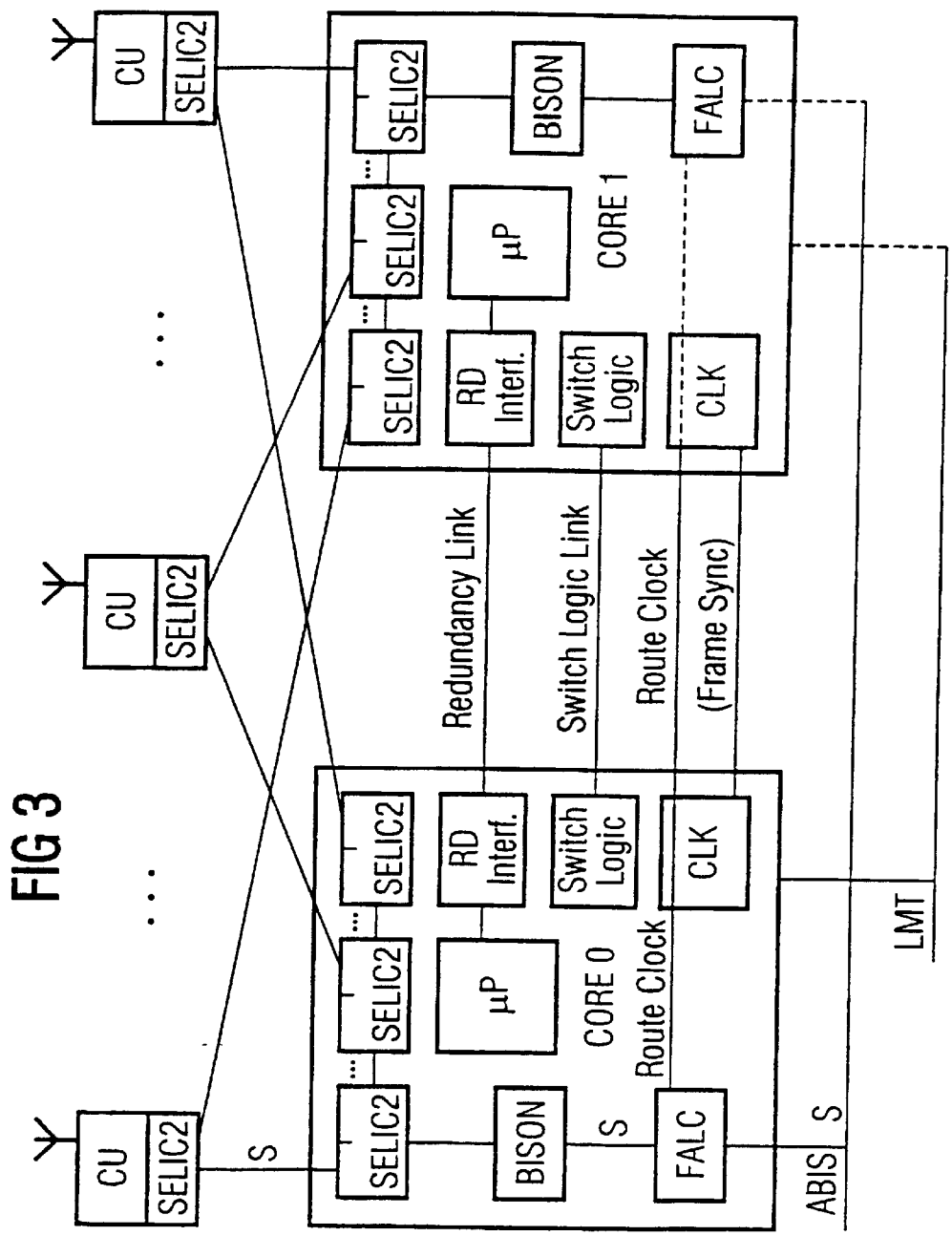
FIG. 3 is a block circuit diagram of connections within a base station.

FIG. 3 shows the structure of the base station BTS in somewhat more detail, each of the transceiver devices CU contains an interface device SELIC2 which is composed of two essentially structurally identical interface devices SELIC, as a result of which two point-to-point connections are possible from the transceiver device CU to a first central unit CORE 0 and a second central unit CORE 1. The central units CORE 0 and CORE 1 also contain interface devices SELIC2 whose number corresponds at least to the number of the transceiver devices CU. As a result, there is redundancy for the central unit CORE, which permits the satisfactory functioning of the base station BTS to be maintained even in the case of a partial failure. Here, one of the two central units CORE 0 or CORE 1 is usually passive.

Both of the central units CORE 0 and CORE 1 contain a device FALC for connecting to the interface $A_{bis}$. The connection compliance with a PCM30 or PCM24 transmission and a conversion for the appropriate frame protocol are thus ensured.

Furthermore, an interface is provided for the local monitoring terminal LMT. Likewise, a bus for alarm messages can be made available for both of the central units CORE 0 and CORE 1.

Traffic data S are transmitted transparently to the interface devices SELIC by the device FALC and a switching device BISON. Signal processing takes place in the transceiver devices CU. In the event of a switch-over between the central units CORE 0 and CORE 1, the interface devices SELIC of the active central unit are deactivated using a switch logic and the interface devices SELIC of the previously passive central unit CORE 1 are activated. The central unit CORE 1 is changed in its entirety even in the case of partial failures.

The interface devices SELIC have an active/passive connection that is controlled by redundancy logic and its own connection between the central units (Redundancy Link). A redundancy interface RD is implemented as a serial link that is a communication interface between main processors UP of the central units CORE 0, CORE 1. The switch logic controls the switching over of the switching components of the central units and interrogates them in order to be informed of their status. The units FALC are also each connected to one another by a clock unit CLK. As a result, the synchronization of the two central units CORE 0 and CORE 1 is ensured.

Figure 4:
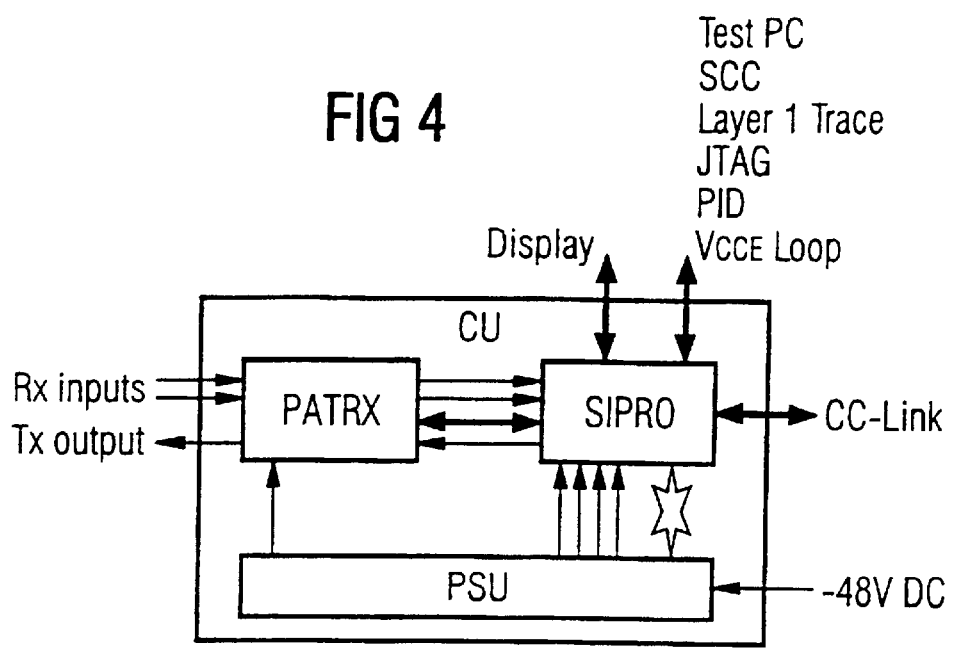
FIG. 4 is a block circuit diagram of the transceiver device.

The transceiver device CU shown in FIG. 4 carries out those functions for the base station BTS that are related to a carrier. In the uplink direction (MS with respect to BTS), two radio frequency signals (Rx inputs) are received in accordance with a diversity reception and converted into TRAU frames and signaling information. In the downlink direction, the TRAU frames and the signaling information are received and converted into a GMSK-modulated radio frequency signal (Tx output) which is amplified to the desired power level. The transceiver device CU is composed of at least the following component units: a power amplification and receiver unit PATRX, a signal processing unit SIPRO, and a power supply unit PSU. The transceiver device CU can be configured for the 900, 1800 or 1900 MHz frequency bands. The differences are mainly in the component unit PATRX.

The signal processing unit SIPRO is equipped with interfaces for testing and monitoring. The power amplifier and receiver unit, PATRX receives the received signals Rx and transmits the transmitted signals Tx. The system is supplied with, for example, −48 volts dc voltage.

Figure 5:
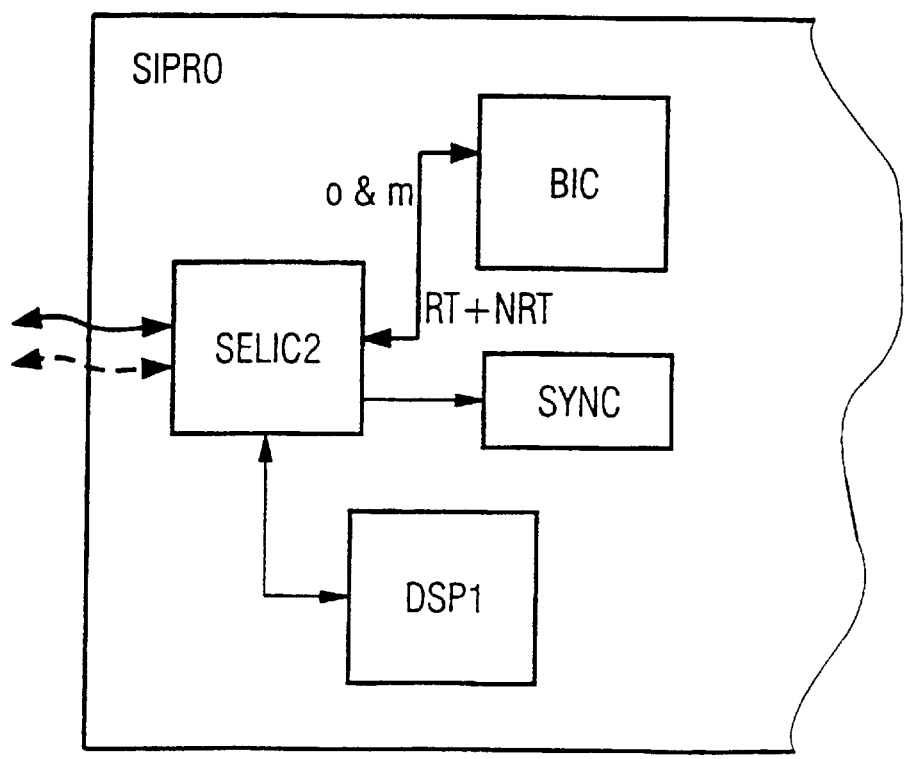
FIG. 5 is a block circuit diagram of a signal processing unit.

The power amplification and receiver unit PATRX is mainly responsible for the analog functions of the transceiver device CU, while the signal processing unit SIPRO according to FIG. 5 is responsible for the signal processing in a signal processing processor DSP1 for uplink and downlink directions, the control of the radio frequency signals, the baseband hopping and synthesizer hopping, the control of the radio channel, the generation and evaluation of control information o&m for maintaining and monitoring and the connection in the direction of the central unit CORE. Furthermore, the functions of the analog/digital conversion and digital/analog conversion and of the local clock generation of the transceiver device CU are implemented in the signal processing unit SIPRO.

The information flow in the uplink direction and downlink direction is shown in FIG. 6. In the uplink direction the signal processing unit SIPRO receives two intermediate frequency signals of a receiver which are analog/digitally converted. Furthermore, the digital signals are converted into the baseband and filtered. An output signal of the filter is equalized and detector data of an equalizer are deciphered. A deciphered data stream is processed by a decoder and subsequently formatted into the TRAU frames. The signaling information is processed separately after decoding.

In the downlink direction, the signal processing device SIPRO receives the TRAU frames and signaling information, the TRAU frames being deformatted and transmitted to a coder. After the coding, the data are deciphered and baseband hopping is carried out. A training sequence is embedded in the data stream, followed by GMSK modulation of the bursts formed. Then, the data stream is digital/analog converted and referred to a transmitter. In parallel with the data stream, phased-locked-loops (PLLs) are programmed for the synthesizer hopping.

The configuration of the interface device SELIC2 of the transceiver device CU according to FIG. 5 is organized according to the configuration of the data transmitted over the individual connection CC-Link. The interface device SELIC2 is connected to a monitoring processor BIC (baseband information controller) for receiving and transmitting the control information o&m and for transmitting real-time data, for example for synchronization. The real-time information is abbreviated as RT and information for which timing is uncritical is abbreviated as NRT. In order to receive and transmit the traffic data S, the interface device SELIC2 is connected to the signal processing processor DSP1 which receives the TRAU frames and extracts the data bits for further signal processing and/or generates TRAU frames from data bits. Furthermore, synchronization information for external devices is made available as a function of the system by a synchronization unit SYNC.

At the central unit CORE ends, the interface device SELIC has two different operating modes depending on whether or not the interface device SELIC in question has a master function on the central unit CORE. If it is the redundant central unit CORE, the associated interface device SELIC is also in the dependent mode.

Figure 7:
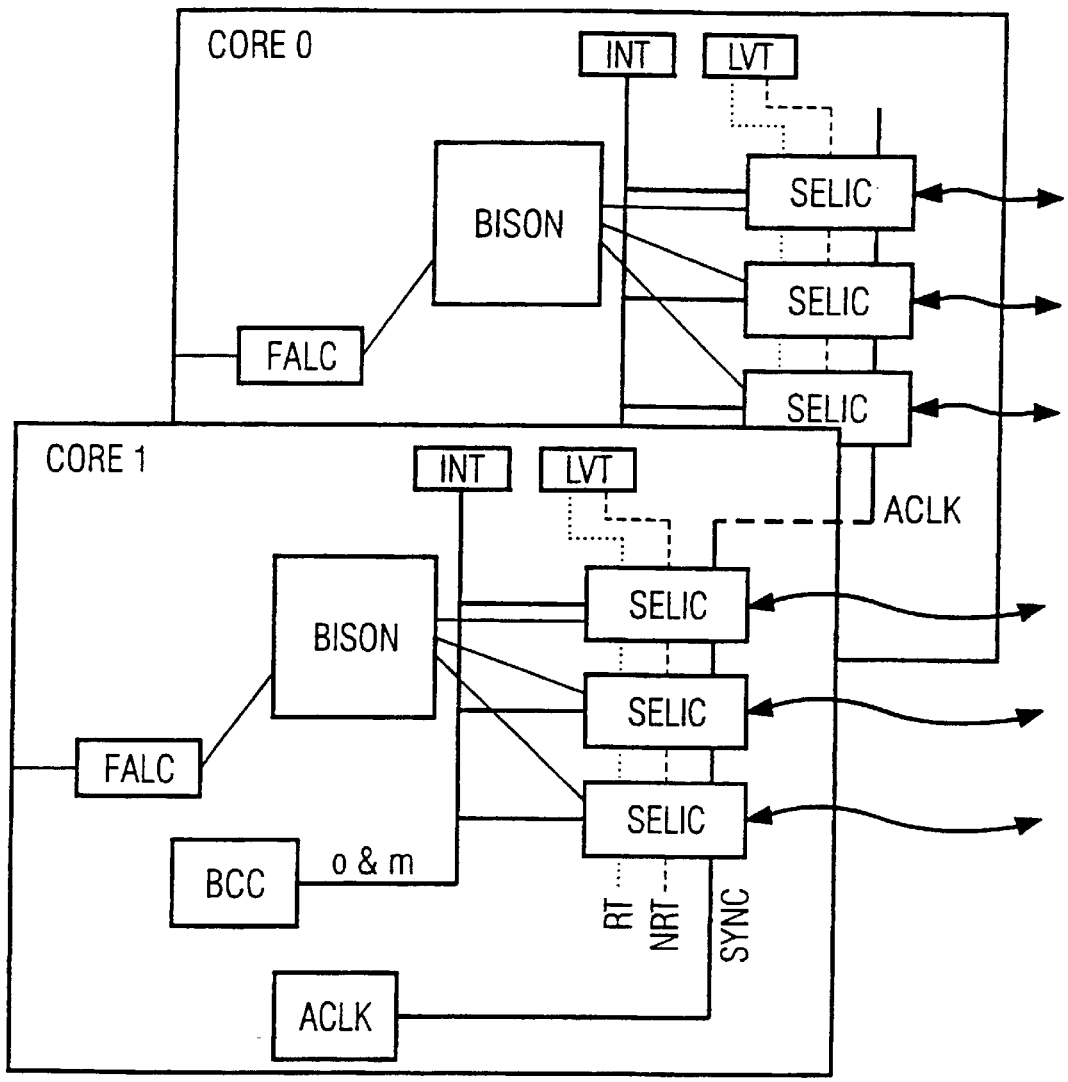
FIG. 7 is a block circuit diagram of the central unit.

The interface devices SELIC of the central units CORE are connected by a microprocessor interface, both for real-time information and for information for which timing is uncritical. The synchronization of the central unit CORE is performed by a synchronization unit ACLK. Each interface device SELIC is connected by the switching device BISON to the unit FALC for transmitting PCM traffic data S. A monitoring processor BCC collects the control information o&m from the interface devices SELIC and controls interruption functions. FIG. 7 shows in turn the redundancy of the central unit CORE. The interface $A_{bis}$ is operated via the device FALC.

In this way, there is an information flow for the traffic data S corresponding to FIG. 8. The signal processing processor DSP1 performs the necessary signal processing functions here. The individual line CC-Link between the central unit CORE and the transceiver device CU constitutes a physical and a logic connection between the two modules. The aforesaid interfaces, with the exception of the bus for alarm messages, are input into a frame-oriented protocol of the individual line CC-Link. The line CC-Link is the only connection between the central unit CORE and transceiver device CU. The individual line CC-Link is implemented by a pair of lines for each transmission direction, as a result of which four physical data streams are formed.

In order to switch off the transceiver device CU, an additional signal for deactivation of the transceiver device CU is provided, the signal being fed separately to the transceiver device CU (see FIG. 11). Furthermore, lines are provided for transmitting clock information. The traffic data S transmitted according to the frame protocol, the control information o&m and information for baseband hopping bbh, which are however transmitted only between the transceiver devices CU (via the central unit CORE) and transmitted separately for the clock information clock, are each provided two physical lines.

FIG. 9 shows the transmission of the control information o&m which contains data relating to the instantaneous status of modules, fault messages and further data within the base stations BTS. For this purpose, a monitoring processor BIC is provided on the transceiver device CU, and a corresponding monitoring processor BCC is provided in the control unit CORE, which processors can likewise exchange control information o&m over the individual line CC-Link. A dedicated bus for the control information o&m within the control unit CORE, also between the two central units CORE 0 and CORE 1 which are kept in reserve, likewise connects the different interface devices SELIC2 of the central unit CORE. If more than one processor is connected to the bus for the control information o&m, the processors are differentiated by logic addresses. For this purpose, there is an interface IF between the central units CORE 1 and CORE 2.

The frequency hopping which is known from the GSM system refers to the option that the carrier frequency is not defined for a connection but rather changes according to a predefined algorithm. The carrier frequency changes to a new value with each time slot, both for the uplink direction and for the downlink direction. The frequency hopping can be implemented by synthesizer hopping or baseband hopping. Synthesizer hopping does not require frequency-selective combiners for the radio-frequency signals. If the synthesizer hopping cannot be used as a result of excessively narrowband transmission filters, baseband hopping is carried out. The traffic data S in the downlink direction, which belong to one time slot, are transmitted in the baseband to the transmitter unit that processes the respective carrier frequency.

In the uplink direction, each transceiver device CU can receive a received signal with synthesizer frequency hopping because this direction is not frequency-selective. Thus, baseband hopping operations are required only in the downlink direction if narrowband combiners are used. This results in the necessity of exchanging information between the transceiver devices CU. In particular in the case of the maximum delays that are predefined by the GSM system, this is a capacity problem for communication between the transceiver device CU and the central unit CORE that is solved by the invention.

FIG. 10 shows by way of example the information flow for a channel when baseband hopping operations are used. The traffic data S are received via the $A_{bis}$ interface, the data received according to the PCM format also containing the control information o&m. The traffic data S are distributed by the switching device BISON to different interface devices SELIC and a microprocessor for controlling the central unit CORE. The traffic data are fed to a transceiver device CU1 over the described individual line CC-Link. Because the current carrier frequency of the connection is processed on a further transceiver device CU2, the traffic data S are transmitted back to the central unit CORE and to the second transceiver device CU2. The transceiver device CU2 does not perform the function of forming the bursts as was carried out already in the first transceiver device CU1 but instead modulates the transmitted signal to the respective carrier frequency, carries out amplification and feeds the transmitted signal to the filter combiner.

Because each of the transceiver devices CU is equipped for the hopping algorithm, it can determine which carrier frequency is processed at a given moment in each transceiver device CU. Thus, the traffic data S are transmitted in message form. For this purpose, the baseband hopping information bbh is provided. In each message, the addressed transceiver device CU is also addressed. The baseband hopping information bbh is consequently transmitted for the described connection in the downlink direction from the first transceiver device CU1 to the second transceiver device CU2 via the central unit CORE.

An information flow for alarm within the base station BTS takes place between the central unit CORE and the transceiver devices CU. In addition to the individual line CC-Link, there is in each case a connection for switching off the transceiver devices CU. Furthermore, an O&M bus to a module for the power supply, to a terminal for alarm registration and to further modules is provided. The alarm messages are either processed by the central unit CORE or by the terminal for alarm registration, and converted into external fault messages.

Finally, the clock supply of the transceiver device CU is shown in FIG. 11. For a GSM transmission, a clock f1 is generated in the central unit CORE by a clock pulse transmitter and transmits over the individual connection CC-Link, but a separate line, a clock information clock to the transceiver device CU. In a local PLL for the clock, the required system clocks are generated by appropriate dividers 1/x and 1/y and further units, for example a phase detector PD, a filter LF and a voltage-control oscillator VCO. For other transmission standards there is appropriate derivation of the required clock rates, it being possible, however, to generate the required values from the PCM clock at any time.

Synchronization information sync, which is also transmitted to the transceiver devices CU over the individual connection CC-Link, is also derived from the PCM clock. In order to synchronize a transceiver device CU, a propagation time measurement of the signal propagation time to the transceiver device CU is also carried out, and the transmission is synchronized with respect to a timing pattern of the radio interface. This is an optional feature. The synchronizing unit ACLK therefore generates the system clock and further synchronization information sync which, in the case of the GSM system, is related to the time slots and can be set in a corresponding way in other standards.

We claim:

1. In a radio communications system, a base station, comprising:
    a least one transceiver device having at least one interface device;
    at least one central unit for controlling the base station and having at least one interface device;
    at least one individual line for connecting said interface device of said transceiver device to said interface device of said central unit in accordance with a point-to-point connection for transmitting traffic data, said interface device of said transceiver device and said interface device of said central unit being configured for propagation time measurement of a transmission over said individual line; and
    at least one of said transceiver device and said central unit having a synchronization device for synchronizing traffic data transmitted on said at least one individual line based on the propagation time measurement.

2. The base station according to claim 1, wherein said central unit has short lines, and said at least one interface device of said central unit is one of a plurality of interface devices connected to one another by said short lines.

3. The base station according to claim 1, wherein said interface device of said transceiver device and said interface device of said central unit have memories so that the traffic data are buffered.

4. The base station according to claim 1, wherein said interface device of said transceiver device and said interface device of said central unit are configured such that the traffic data are transmitted serially.

5. The base station according to claim 1, wherein said individual line is formed by a pair of lines for each transmission direction.

6. The base station according to claim 1, wherein said interface device of said transceiver device and said interface device of said central unit are configured to transmit at least one of clock information and control information.

7. The base station according to claim 1, wherein said interface device of said transceiver device and said interface device of said central unit are configured to transmit information for baseband hopping between carrier-related transceiver devices.

8. The base station according to claim 5, wherein said interface device of said transceiver device and said interface device of said central unit are configured such that real-time information and information for which timing is uncritical are transmitted together over said individual line.

9. The base station according to claim 1, wherein said central unit has a bus structure, and said at least one interface device of said central unit is one of a plurality of interface devices connected to one another by said bus structure.

10. The base station according to claim 9, wherein said bus structure within said central unit contains separate lines for real-time information and for information for which timing is uncritical.

11. The base station according to claim 1, wherein said interface device of said transceiver device and said interface device of said central unit are configured to transmit with a frame-oriented protocol.

12. The base station according to claim 11, wherein a timing pattern of the frame-oriented protocol is oriented according to a timing pattern of a PCM transmission.

13. The base station according to claim 1, wherein said interface device of said transceiver device and said interface device of said central unit are configured to transmit a synchronization signal from said central unit to said transceiver device.

14. The base station according to claim 13, wherein the synchronization signal can be adjusted individually for a plurality of transceiver devices.

15. The base station according to claim 1, wherein said at least one transceiver device is one of a plurality of transceiver devices which use different radio interface standards.

16. The base station according to claim 1, including a second central unit and at least one further individual line, and said at least one transceiver device is additionally connected to said second central unit by said further second individual line in accordance with the point-to-point connection.

17. The base station according to claim 6, wherein said interface device of said transceiver device and said interface device of said central unit are configured such that real-time information and information for which timing is uncritical are transmitted together over said individual line.

18. The base station according to claim 7, wherein said interface device of said transceiver device and said interface device of said central unit are configured such that real-time information and information for which timing is uncritical are transmitted together over said individual line.

19. In a radio communications system, a base station, comprising:
    at least two transceiver devices each having at least one interface device;
    at least one central unit for controlling the base station and having at least one interface device;
    at least one individual line for connecting each of said at least one interface device of said at least two transceiver devices to said at least one interface device of said at least one central unit in accordance with a point-to-point connection for transmitting traffic data, said at least one interface device of said at least two transceiver devices and said at least one interface device of said at least one central unit being configured for propagation time measurements of a transmission over said at least two individual lines; and
    at least one of said at least two transceiver devices and said at least one central unit having a synchronization device for synchronizing traffic data transmitted on said at least two individual lines with each other based on the propagation time measurements.

* * * * *